United States Patent [19]

Cunningham

[11] Patent Number: 5,450,822
[45] Date of Patent: Sep. 19, 1995

[54] APPARATUS AND METHOD FOR ELECTROLYSIS TO ENHANCE COMBUSTION IN AN INTERNAL COMBUSTION ENGINE

[76] Inventor: John E. Cunningham, 26 Hird St., Niagara Falls, N.Y. 14304

[21] Appl. No.: 190,777

[22] Filed: Feb. 1, 1994

[51] Int. Cl.⁶ .......................................... F02B 43/08
[52] U.S. Cl. .............................. 123/3; 123/DIG. 12; 204/272
[58] Field of Search ............... 123/1 A, 3, DIG. 12; 204/DIG. 4, 272

[56] References Cited

U.S. PATENT DOCUMENTS

| | | | |
|---|---|---|---|
| 4,111,160 | 9/1978 | Talenti | 123/1 A |
| 4,113,601 | 9/1978 | Spirig | 204/272 |
| 4,271,793 | 6/1981 | Valdespino | 123/DIG. 12 |
| 4,332,219 | 6/1982 | Gonzalez | 123/DIG. 12 |
| 5,105,773 | 9/1992 | Cunningham et al. | 123/3 |

*Primary Examiner*—Tony M. Argenbright
*Assistant Examiner*—Erick Solis
*Attorney, Agent, or Firm*—Phillips, Lytle, Hitchcock, Blaine & Huber

[57] ABSTRACT

The present invention 10 comprises a hollow main canister 12 having a plurality of conductive plates 19 interposed therein each acting as both an anode and a cathode when electrolysis of an electrolytic fluid, such as potassium hydroxide, occurs in the main canister. The electrolysis reaction is powered by a current source 24 normally attached to an electrode 14 interposed in the main canister 12 seeking the grounded walls of the main canister 11. The current can also be attached to the walls of the main canister and the electrode 14 grounded. The voltage is divided between the conductive plates 19 in this circuit. The produced ionized hydrogen and oxygen from the electrolytic reaction is directed through the main canister to the combustion situs 23 of an internal combustion engine fuel/air mixture system through the use of a delivery fitting 21 and a delivery tube 22. The hydrogen and oxygen interposed within the combustion situs enhances combustion and the cleanliness of the same thereby producing a cleaner and more efficient fuel burn.

34 Claims, 2 Drawing Sheets

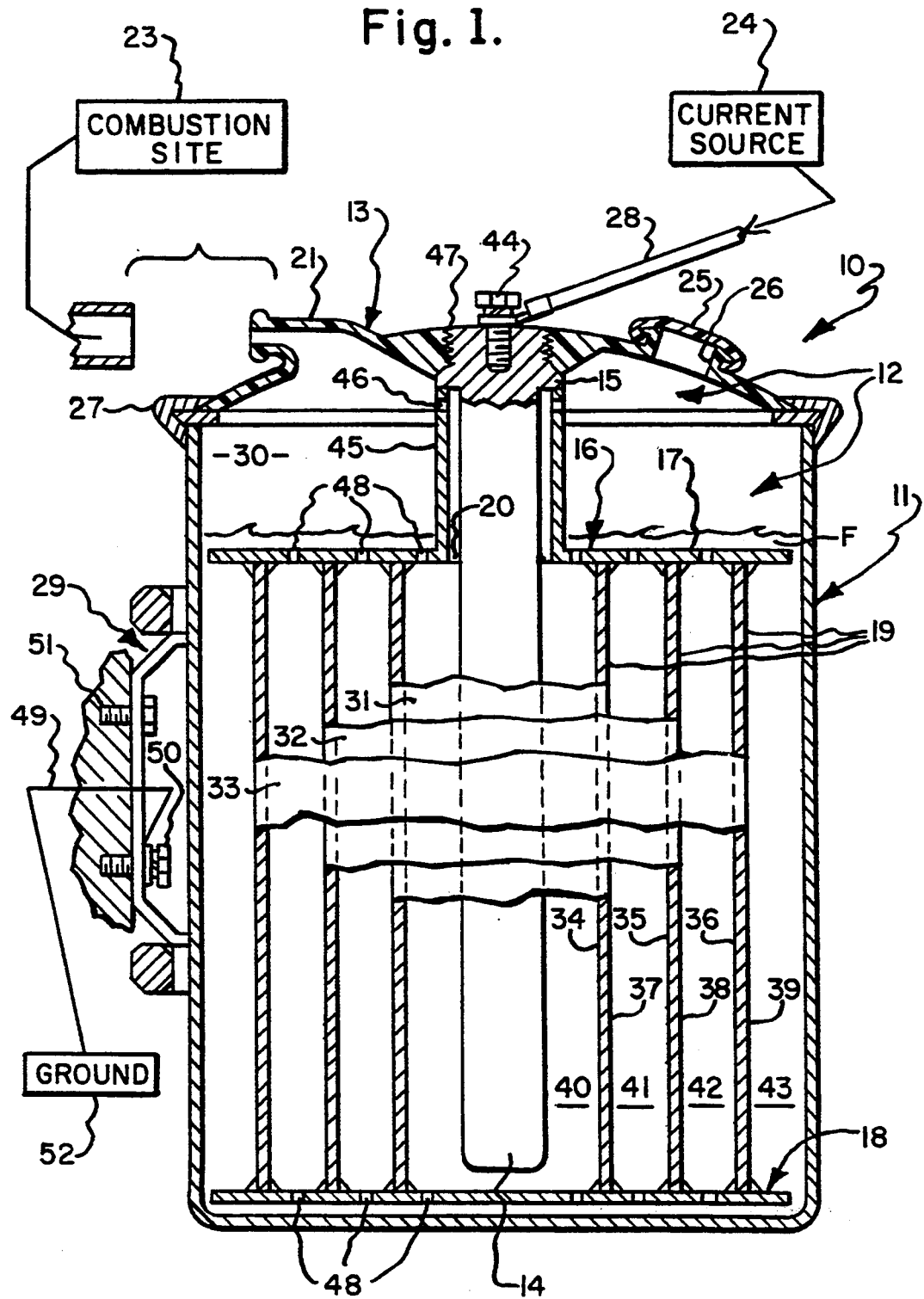

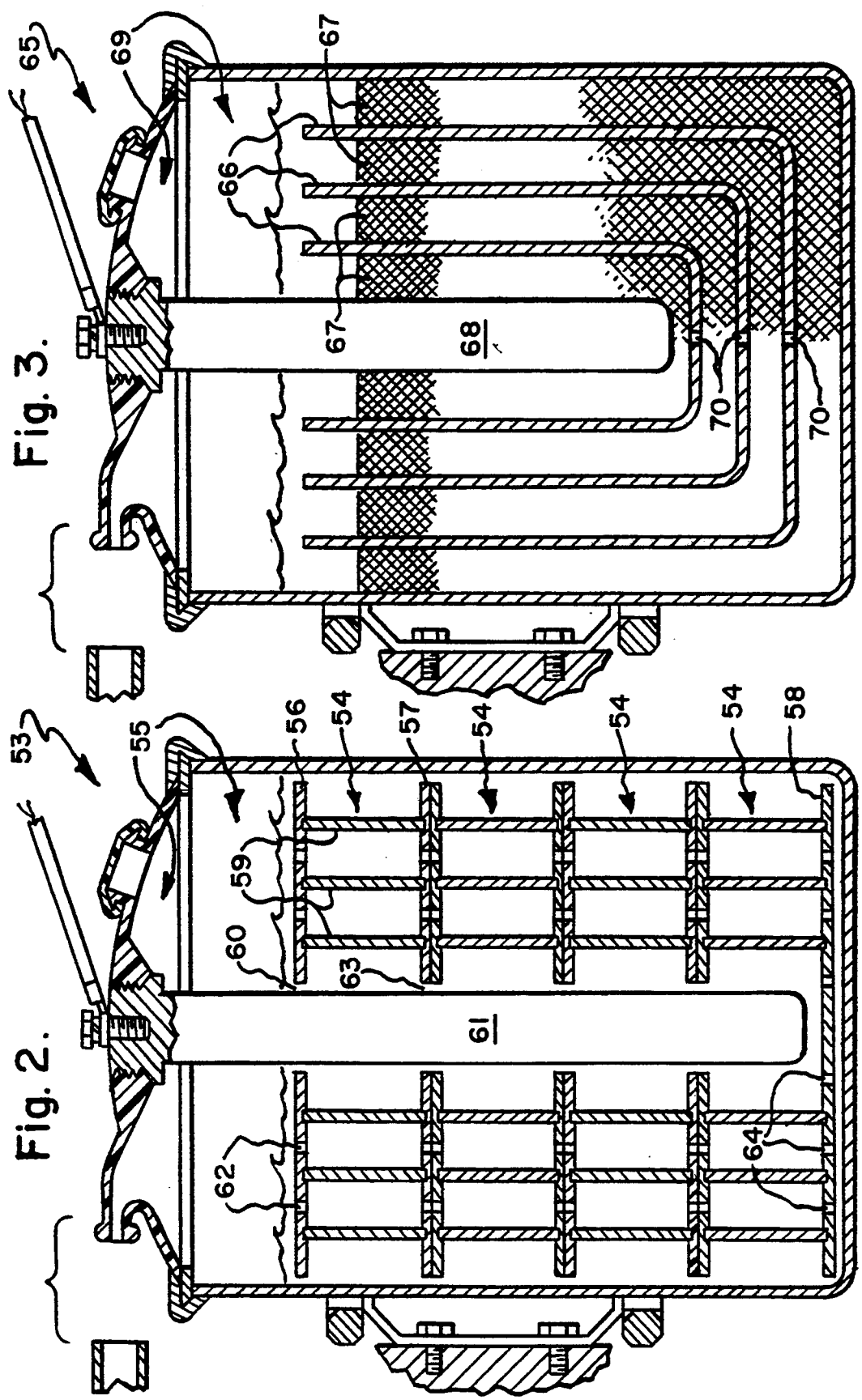

APPARATUS AND METHOD FOR ELECTROLYSIS TO ENHANCE COMBUSTION IN AN INTERNAL COMBUSTION ENGINE

TECHNICAL FIELD

The present invention relates generally to internal combustion engines and the use of electrolytically generated hydrogen and oxygen to enhance combustion efficiency and cleanliness and more particularly, to an electrolyser device designed for use in automobiles or other vehicles to produce a requisite amount of hydrogen and oxygen through the variation of voltage across the system and variation of surface area and orientation of combination anode/cathode conductive plates.

BACKGROUND OF THE INVENTION

The typical internal combustion engine generally used in automobiles, trucks and other similar vehicles use various fuels for combustion. It is well known burning of these fuels is not one hundred percent efficient and further, produces large amounts of pollutants as a byproduct of the combustion process. Accordingly, many attempts have been made to enhance the completeness of combustion by the introduction of various catalysts and additives, including gaseous hydrogen and oxygen, into the burning process. Such attempts were made with the goal of improving combustion efficiency and cleanliness, while ensuring the stability of the combustion process and viability of engine components.

In particular, many attempts have been made in the prior art to use a basic electrolysis reaction of various solutions (water or other chemical compositions containing oxygen and hydrogen) to produce elemental oxygen and hydrogen in gaseous form. These gases, known to increase the efficiency of combustion within certain ranges, are then typically introduced either singly or together into the combustion situs to achieve the goal of improved combustion efficiency and concomitant cleanliness. For example, U.S. Pat. Serial No. 4,111,160 provides a broad overview of the prior art attempts and the use of the basic electrolysis reaction to achieve enhanced combustion.

The present invention is an improvement over U.S. Pat. No. 5,105,773 employing unique mesh anodes interposed between cathode plates partially submerged in electrolytic solution to produce hydrogen and oxygen by electrolysis. The '773 patent discloses an electrolysis system for the improvement of engine efficiency without the need for storage tanks, pressure valves or the like in a safe efficient manner.

The present invention provides each benefit of the '773 patent while solving problems not addressed by the prior art; e.g. heat energy production from electrolysis, connection corrosion from contact with the electrolyte, difficult maintenance of the device and the effects of vibration. Heat production is reduced by using a series circuit with definable resistance cross the entire electrolysis site. The present invention solves the corrosion problem by placing all electrical connections outside the main canister containing the electrolyte. The present invention also provides simplified maintenance over the prior art by employing easily removable and replaceable electrolysis sites. Finally, in the prior art, vibrations degraded the canister mounted connections of the electrolysis sites reducing the life and efficiency of the devices. In the present invention, the electrolysis sites are not attached to the main canister, reducing the effects of vibration.

Accordingly, the invention improves over the prior art by solving a variety of problems not addressed by the prior art using simple, straightforward and easily adaptable solutions.

DISCLOSURE OF THE INVENTION

The present invention (e.g. 10) provides a device producing free hydrogen and oxygen by electrolysis for delivery to the combustion site of an internal combustion engine to increase the combustion efficiency and reduce the pollutant products of combustion. In particular, the preferred embodiment of the device has a hollow main canister (e.g. 12) with a cup shaped side and bottom portion (e.g. 11 ) and a top portion (e.g. 13) adapted to sealably engage the cup shaped portion; an electrode (e.g. 14) attached to the top portion; an energy cartridge (e.g. 16) disposed to fit in the hollow main canister and positioned about the electrode, having a top plate (e.g. 17) a bottom plate (e.g. 18), and conductive plates (e.g. 19), the top plate having an opening (e.g. 20) to accommodate the electrode therethrough, and secondary openings (e.g. 46) to allow easier movement of the released gases to the delivery fitting (e.g. 21) leading to the vehicle engine through a delivery tube (e.g. 22), the bottom plate also having secondary openings (e.g. 46) used to maintain a similar level of fluid throughout the main canister; and an electrolyte fluid having a volume sufficient to cover the surface area of the conductive plates but leaving air space (e.g. 30) above the energy cartridge.

In operation, the device produces gaseous hydrogen and oxygen through an electrolytic reaction. In particular, the charging of the electrode and the grounding of the main canister outer wall creates an electric circuit in series across the conductive plates and the gaps between the conductive plates filled with the electrolytic fluid. Each conductive plate acts as both an anode and a cathode. For example, the inner most plate (e.g. 31) has a surface facing the electrode (e.g. 34) and a surface facing the main canister wall (e.g. 37). If a positive charge is induced on the electrode, it will induce a negative charge on the surface of the inner most conductive plate facing the electrode (e.g. 37). This will induce a positive charge on the surface of the inner most conductive plate facing the main canister wall (e.g. 37). The surfaces of each conductive plate acquire alternating charges through this process completing a circuit between the electrode and the grounded wall of the main canister.

The gaps between the conductive plates (e.g. 40, 41, 42, 43) are at least partially filled with electrolyte. The electrolyte in the gaps act as resistors in the system. Dividing the available voltage between the conductive plates by placing the conductive plates in a series circuit reduces heat production when compared to systems placing the entire applied voltage on each conductive plate (e.g. the '773 patent).

The invention produces a desired amount of hydrogen and oxygen by varying the number of conductive plates, their spacing or varying the voltage applied to the system. The precise control makes storage tanks, pressure control valves or devices to monitor the reaction unnecessary. The free hydrogen and oxygen surfaces at the top portion of the main canister and is then delivered through a delivery fitting through the delivery tube to the combustion site of the fuel/air system and is ignited in an ordinary manner, e.g. by a spark plug, as the internal combustion engine functions to burn fuel.

Electrolysis sites in the prior art have been fixed inside a canister by supports attached to or extending through the canister wall. (See, U.S. Pat. No. 5,231,954, the '160 patent and the '773 patent). These mountings are susceptible to breaking, setting the electrolysis sites free inside the canister. Vibrations may also loosen the seal where a support extends through the canister wall allowing electrolyte and free hydrogen and oxygen to escape. In the present invention, the electrolysis sites are not attached to the main canister wall thus reducing damage by vibration.

Thus, a primary object of this invention is to produce hydrogen and oxygen using an electrolyser device where the available voltage is divided between the conductive plates reducing heat production.

A further object of the invention is to produce hydrogen and oxygen through electrolysis that may be delivered to an internal combustion engine combustion site with out need for storage tanks, valves or the like.

Still another object of the invention is to produce hydrogen and oxygen through electrolysis using easily maintained, repaired and replaceable components.

Still another object of the invention is to produce hydrogen and oxygen through electrolysis in a system with no electrical connections contacting the electrolyte.

Yet another object of the invention is to minimize the effects of vibration on a system producing hydrogen and oxygen through electrolysis to increase the longevity and efficiency of the electrolysis system.

These and other objects of the invention will become apparent from the foregoing and ongoing written specification, the drawing figures and claims that follow.

BRIEF DESCRIPTION OF THE DRAWINGS

FIG. 1 is a fragmentary longitudinal sectional view of the preferred embodiment of the device showing the structure of the energy cartridge.

FIG. 2 is a fragmentary longitudinal sectional view of a second embodiment of the device showing a plurality of energy cartridges and their structure.

FIG. 3 is a fragmentary longitudinal sectional view of a third embodiment of the device showing the interposition of a plurality of cup-shaped conductive plates and mesh spacers.

MODE(S) OF CARRYING OUT THE INVENTION

At the outset, it should be clearly understood that like reference numerals are intended to identify the same structural elements, portions or surfaces consistently throughout the several drawings figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Adverting to FIG. 1., the device 10 is shown to generally comprise a cupshaped side and bottom portion 11 and a top portion 13. The side and bottom portion 11 is normally fabricated from a conductive, corrosion resistant material. The top portion 13 is normally fabricated from light weight PVC material or a similar material to minimize weight while maintaining durability and sealing capability. Top portion 13 and side and bottom portion 11 are sealably connected using a pressure sensitive sealing ring 27 normally made from an elastomer. As a safety feature, sealing ring 27 is designed to give way when an excessive pressure is reached inside the main canister. Side and bottom portion 11, when joined with the top portion 13, form a main canister 12. Cylindrical electrode 14 has threading on its outside surface at one end adapted to engage a hollow screw plug 47 designed into the inside surface of the top portion 13. The electrode 14 is also adapted to receive a screw 44 in its top surface, securing to the electrode 14 voltage supply wire 28 leading to a current source 24. The cap 25 sealably engages a projection 26 of the top portion 13. Removal of the cap 25 allows easy access to the interior of the main canister.

Energy cartridge 16 fits inside the hollow of main canister 12. A hollow vertical cylinder 45 surrounds an opening 20 through the top plate large enough to accommodate the electrode 14 and extends upward where it contacts a projection 15 of the electrode, thereby, stabilizing the energy cartridge 16. The hollow vertical cylinder 45 also has openings 46 between its inner and outer surfaces to allow hydrogen and oxygen produced to reach the delivery fitting 21 and thus, the combustion site 23. The top plate 17 and bottom plate 18 have small openings 48 to allow the hydrogen and oxygen produced to easily escape to the delivery fitting 21 and for the electrolyte F to seek a common level throughout the system. The conductive plates 31, 32 and 33 are thin walled cylinders made of conductive material (e.g. stainless steel) and are disposed about the electrode 14. Each conductive plate 31, 32 and 33 is attached to the top plate 17 and the bottom plate 18. The electrode 14 is positioned inside the hollow vertical cylinder 45 and through an opening 20 in the top plate 17 allowing the conductive plates to circle the electrode.

Bracket 29 is attached to the outside surface of the side and bottom portion 11. An electrical wire 49 attached to a screw 50 on the bracket leads to a grounded part of the internal combustion engine 52. Screws 50 and 51 mount the main canister to a grounded part of the vehicle.

Electrolytic fluid F is interposed within the hollow of the main canister in a sufficient volume to cover all or a major portion of the conductive plates. Typically, the electrolytic fluid is potassium hydroxide or a similar compound able to generate free oxygen and hydrogen ions as a result of an electrolytic reaction. The volume of fluid F will generally not entirely fill the hollow main canister and a space 30 will typically be left at the top portion thereof.

In operation, the device is interposed within the engine compartment of an internal combustion engine fuel/air mixture system and is arranged to communicate with the combustion system of the vehicle. The device is also connected to a current source 24, e.g. the generator or battery, so a small amount of current may be provided through the device.

In a normal electrolysis reaction, a positive current is supplied to the electrode. The current jumps gaps 40, 41, 42 and 43 defined by the conductive plates, the electrode 14 and the side and bottom portion 11. As a result, each conductive plate acts as both an anode and a cathode. When a positive charge is induced on the electrode 14, surfaces 34, 35 and 36 act as cathodes and surfaces 37, 38 and 39 act as anodes. The electrolyte in gaps 40, 41, 42 and 43 act as resistors in the circuit.

Adverting to FIG. 2. a second embodiment of the invention 53 is the same in all respects to the preferred embodiment shown in FIG. 1. except for the use of multiple energy cartridges 54 instead of a single energy cartridge. A series of cylindrical energy cartridges 54 are stacked one on top of another inside the main canister 55. Each energy cartridge has a top plate 56, a bottom plate 57 and conductive plates 59. Each top plate has an opening 60 between its upper and lower surface adapted to receive the electrode 61 therethrough and secondary openings 62 to allow movement of produced hydrogen and oxygen and electrolyte throughout the main canister 55. Each bottom plate 57 except bottom plate 58, has an opening 63 between its upper and lower surfaces adapted to receive the electrode 61 therethrough. Bottom plate 58 does not have an opening between its upper and lower surfaces so the charge induced on the electrode 61 will not leak to the main canister 55 bottom without crossing conductive plates 59. Each bottom plate 57, including bottom plate 58, has secondary openings 64 to allow movement of produced hydrogen and oxygen and electrolyte throughout the main canister 55.

Adverting to FIG. 3., a third embodiment of the invention 65 is the same in all respects to the preferred embodiment shown in FIG. 1. except for the substitution of a plurality of cup-shaped conductive plates 66 separated by cup-shaped mesh spacers 67 for the energy cartridge. Accordingly, the inner portion of main canister 69 has an electrode 68 axially positioned at the center of a series of cylinders, one within another, alternating between mesh spacer 67 and conductive plate 66.

The mesh spacers 67 are non-deforming and made from a resilient nonconductive material. The conductive plates are made from a conductive material and have openings 70 between their inner and outer surfaces to allow movement of produced hydrogen and oxygen and electrolyte through out the main canister 69.

The inner and outer diameters of the conductive plates 66 and the mesh spacers 67 are such that each conductive plate and mesh spacer fits tightly one within another, thus reducing movement and vibration. A series circuit forms across the areas between the conductive plates 66 filled by the spacers 67 and electrolyte when a charge is induced on the electrode 68 inducing the conductive plates to act as both anodes and cathodes.

The space between the conductive plates is easily altered by changing the diameter of the conductive plates 66 and corresponding changes in the diameters of the mesh spacers 67.

MODIFICATIONS TO THE INVENTION

It is clear from the specification, drawings and descriptions of the invention that many modifications and changes may be made without departing from the invention.

For instance, although potassium hydroxide is used as the electrolytic fluid, other fluids of similar characteristics could be used. Moreover, the number and dimensions of the conductive plates, mesh spacers and energy cartridges may readily be varied to produce an appropriate reaction.

Also, the material used for the conductive plates, stainless steel, is merely an example as many conductive materials are appropriate.

These and other modifications and changes to the invention would be readily apparent to one of ordinary skill in the art and anticipated by the specification and description of the invention, as well as the following claims.

I claim:

1. An electrolyser device for use in an internal combustion engine fuel/air mixture system for enhancing combustion, comprising:

a main canister, interposed within said internal combustion engine fuel/air mixture system, said main canister having a top portion and a bottom portion and side portions forming a hollow cavity, adapted to sealably contain a fluid therein and having electrical connector means operably engaged on the outside of said main canister;

a delivery fitting interposed on the top surface of said main canister and forming a communicating passageway between said inside hollow of said main canister and outside of said main canister;

a delivery tube flexibly attached to said outside portion of said delivery fitting adapted to carry fluids therethrough;

an electrode arranged within said main canister having electrical connector means;

an energy cartridge arranged within said main canister, said energy cartridge comprising a top plate, a bottom plate and a plurality of conductive plates, said top plate having an upper surface, a lower surface and an opening between said upper surface and said lower surface adapted to receive said electrode therethrough, said bottom plate having an upper surface and a lower surface, and said conductive plates interposed between said top plate and said bottom plate and disposed about said electrode, said conductive plates further comprising a surface facing the inside surface of said main canister and a surface facing said electrode;

an electrolytic fluid containing hydrogen and oxygen, interposed within said main canister such that the surface area of said conductive plates are covered thereby;

whereby, upon application of voltage differential between the outside of said main canister and said electrode across said conductive plates, an electrolysis reaction occurs freeing gaseous hydrogen and oxygen through said delivery valve and said delivery tube dependent upon said orientation of said members.

2. The device according to claim 1 wherein said top plate and said bottom plate of said energy cartridge are non-conductive.

3. The device according to claim 1 wherein said top plate of said energy cartridge further comprises secondary openings between said upper surface and said lower surface.

4. The device according to claim 1 wherein said bottom plate of said energy cartridge further comprises secondary openings between said upper surface and said lower surface.

5. The device according to claim 1 wherein said conductive plates are stainless steel.

6. The device according to claim 1 wherein said energy cartridge is of unitary construction.

7. An electrolyser device for use in an internal combustion engine fuel/air mixture system for enhancing combustion, comprising:
- a main canister, interposed within said internal combustion engine fuel/air mixture system, said main canister having a top portion and a bottom portion and side portions forming a hollow cavity, adapted to sealably contain a fluid therein and having electrical connector means operably engaged on the outside of said main canister;
- a delivery fitting interposed on the top surface of said main canister and forming a communicating passageway between said inside hollow of said main canister and outside of said main canister;
- a delivery tube flexibly attached to said outside portion of said delivery fitting adapted to carry fluids therethrough;
- an electrode arranged within said main canister having electrical connector means operably engaged;
- a plurality of energy cartridges arranged within said main canister, each said energy cartridge comprising a top plate, a bottom plate and a plurality of conductive plates, said top plate having an upper surface, a lower surface and an opening between said upper surface and said lower surface adapted to receive said electrode therethrough, said bottom plate having an upper surface and a lower surface and an opening between said upper surface and said lower surface adapted to receive said electrode therethrough, and said conductive plates interposed between said top plate and said bottom plate and disposed about said electrode, said conductive plates further comprising a surface facing the inside of said main canister and a surface facing said electrode;
- an electrolytic fluid containing hydrogen and oxygen, interposed within said main canister such that the surface area of said conductive plates are covered thereby;
- whereby, upon application of voltage differential between the outside of said main canister and said electrode across said conductive plates, an electrolysis reaction occurs freeing gaseous hydrogen and oxygen through said delivery valve and said delivery tube dependent upon said orientation of said members.

8. The device according to claim 7 wherein said bottom plate of said energy cartridge disposed about the bottom of said electrode has an upper surface and a lower surface.

9. The device according to claim 7 wherein said top plate of each said energy cartridge further comprises secondary openings between said upper surface and said lower surface.

10. The device according to claim 7 wherein said bottom plate of each said energy cartridge further comprises secondary openings between said upper surface and said lower surface.

11. The device according to claim 8 wherein said bottom plate of each said energy cartridge further comprises secondary openings between said upper surface and said lower surface.

12. The device according to claim 7 wherein said conductive plates are stainless steel.

13. An electrolyser device for use in an internal combustion engine fuel/air mixture system for enhancing combustion, comprising:
- a main canister, interposed within said internal combustion engine fuel/air mixture system, said main canister having a top portion and a bottom portion and side portions forming a hollow cavity, adapted to sealably contain a fluid therein and having electrical connector means operably engaged on the outside of said main canister;
- a delivery fitting interposed on the top surface of said main canister and forming a communicating passageway between said inside hollow of said main canister and outside of said main canister;
- a delivery tube flexibly attached to said outside portion of said delivery fitting adapted to carry fluids therethrough;
- an electrode arranged within said main canister having electrical connector means operably engaged;
- a plurality of conductive plates interposed within said inside of said main canister, said conductive plates further comprising a hollow shape such that said conductive plates are adapted to be spaceably arranged one within another;
- a plurality of non-conductive mesh spacers interposed within said hollow of said main canister, said mesh spacers comprising a hollow shape each of preselected dimensions such that each said mesh spacer is adapted to be arranged one within another and within the spaces between said conductive plates;
- an electrolytic fluid containing hydrogen and oxygen, interposed within said main canister such that the surface area of said conductive plates are covered thereby;
- whereby, upon application of voltage differential between the outside of said main canister and said electrode across said conductive plates, an electrolysis reaction occurs freeing gaseous hydrogen and oxygen through said delivery valve and delivery tube dependent upon said orientation of said conductive plates.

14. The device according to claim 13 wherein said conductive plates and said mesh spacers are cup shaped.

15. The device according to claim 13 wherein said conductive plates and said mesh spacers are cylinders.

16. The device according to claim 13 wherein said conductive plates further comprise a plurality of openings between the inside surface of said hollow shape and outside surface of said hollow shape.

17. The device according to claim 13 wherein said conductive plates are made of stainless steel.

18. In an internal combustion engine fuel system having a combustion site, the method of providing gaseous hydrogen and oxygen through electrolysis to enhance combustion, comprising the steps of:
- providing a hollow main canister within said fuel system adapted to sealably contain a fluid and having electrical connector means operably engaged on the outside of said main canister;
- providing a delivery fitting interposed on the top surface of said hollow main canister such that there is a communicating passageway between said main canister hollow inside and outside;
- providing a delivery tube flexibly attached to said delivery fitting and adapted to carry a fluid therethrough;

providing an electrode arranged within said main canister having electrical connector means outside said main canister;

providing an energy cartridge interposed within said hollow main canister comprising a top plate, a bottom plate and a plurality of conductive plates, said top plate having an upper surface, a lower surface and an opening between said upper surface and said lower surface adapted to receive said electrode therethrough, said bottom plate having an upper surface and a lower surface, and said conductive plates interposed between said top plate and said bottom plate and disposed about said electrode, each conductive plate further comprising a surface facing the inside surface of said main canister and a surface facing said electrode;

providing an electrolytic fluid containing hydrogen and oxygen, interposed within said main canister such that the surface area of said conductive plates is covered thereby;

varying the number of said conductive plates, the surface area of said conductive plates, the distance between said conductive plates and the voltage applied to the system such that on application of the voltage, electrolysis of said electrolytic fluid occurs such that a desired amount of hydrogen and oxygen are produced;

venting said produced hydrogen and oxygen gas through said delivery fitting and said delivery tube to said combustion site of said internal combustion engine fuel/air mixture system;

whereby the introduction of gaseous hydrogen and oxygen into the combustion process enhances the completeness and cleanliness of the same.

19. The method according to claim 18 where said top plate and said bottom plate provided are non-conductive.

20. The method according to claim 18 where said top plate of said energy cartridge provided further comprises secondary openings between said upper surface and said lower surface.

21. The method according to claim 18 where said bottom plate of said energy cartridge provided further comprises secondary openings between said upper surface and said lower surface.

22. The method according to claim 18 where said conductive plates provided are stainless steel.

23. The method according to claim 18 where said energy cartridge provided is of unitary construction.

24. In an internal combustion engine fuel system having a combustion site, the method of providing gaseous hydrogen and oxygen through electrolysis to enhance combustion, comprising the steps of:

providing a hollow main canister within said fuel system adapted to sealably contain a fluid and having electrical connector means operably engaged on the outside of said main canister;

providing a delivery fitting interposed on the top surface of said hollow main canister such that there is a communicating passageway between said main canister hollow inside and outside;

providing a delivery tube flexibly attached to said delivery fitting and adapted to carry a fluid therethrough;

providing an electrode arranged within said main canister having electrical connector means outside said main canister;

providing a plurality of energy cartridges arranged within said main canister, said energy cartridge comprising a top plate, a bottom plate and a plurality of conductive plates, said top plate having an upper surface, a lower surface and an opening between said upper surface and said lower surface adapted to receive said electrode therethrough, said bottom plate having an upper surface and a lower surface and an opening between said upper surface and said lower surface adapted to receive said electrode therethrough, and said conductive plates interposed between said top plate and said bottom plate and disposed about said electrode, said conductive plates further comprising a surface facing the inside of said main canister and a surface facing said electrode;

providing an electrolytic fluid containing hydrogen and oxygen, interposed within said main canister such that the surface area of said conductive plates is covered thereby;

varying the number of said conductive plates, the surface area of said conductive plates, the distance between said conductive plates and the voltage applied to the system such that on application of the voltage, electrolysis of said electrolytic fluid occurs such that a desired amount of hydrogen and oxygen are produced;

venting said produced hydrogen and oxygen gas through said delivery fitting and said delivery tube to said combustion site of said internal combustion engine fuel/air mixture system;

whereby the introduction of gaseous hydrogen and oxygen into the combustion process enhances the completeness and cleanliness of the same.

25. The method according to claim 24 where said bottom plate of said energy cartridge disposed about the bottom of said electrode provided has an upper surface and a lower surface.

26. The method according to claim 24 where said top plate of each said energy cartridge provided further comprises secondary openings between said upper surface and said lower surface.

27. The method according to claim 24 where said bottom plate of each said energy cartridge provided has secondary openings between said upper surface and said lower surface.

28. The method according to claim 25 where said bottom plate of each said energy cartridge provided has secondary openings between said upper surface and said lower surface.

29. The method according to claim 24 where said conductive plates provided are stainless steel.

30. In an internal combustion engine fuel system having a combustion site, the method of providing gaseous hydrogen and oxygen through electrolysis to enhance combustion, comprising the steps of:

providing a hollow main canister within said fuel system adapted to sealably contain a fluid and having electrical connector means operably engaged on the outside of said main canister;

providing a delivery fitting interposed on the top surface of said hollow main canister such that there is a communicating passageway between said main canister hollow inside and outside;

providing a delivery tube flexibly attached to said delivery fitting and adapted to carry a fluid therethrough;

providing an electrode arranged within said main canister having electrical connector means outside said main canister;

providing a plurality of conductive plates interposed within said inside of said main canister, said conductive plates comprise a hollow shape such that each said conductive plate is adapted to be spaceably arranged one within another;

providing a plurality of non-conductive mesh spacers interposed within said hollow of said main canister, each of said mesh spacers comprising a hollow shape each of preselected dimensions such that each of said mesh spacers is adapted to be arranged one within another and within the spaces between said conductive plates;

providing an electrolytic fluid containing hydrogen and oxygen, interposed within said main canister such that the surface area of said conductive plates is covered thereby;

varying the number of said conductive plates, the surface area of said conductive plates, the distance between said conductive plates and the voltage applied to the system such that on application of the voltage, electrolysis of said electrolytic fluid occurs such that a desired amount of hydrogen and oxygen are produced;

venting said produced hydrogen and oxygen gas through said delivery fitting and said delivery tube to said combustion site of said internal combustion engine fuel/air mixture system;

whereby the introduction of gaseous hydrogen and oxygen into the combustion process enhances the completeness and cleanliness of the same.

31. The method according to claim 30 where said conductive plates and said mesh spacers provided are cup shaped.

32. The method according to claim 30 where said conductive plates and said mesh spacers provided are cylinders.

33. The method according to claim 30 where said conductive plates provided further comprise a plurality of openings between the inside surface of said hollow shape and outside surface of said hollow shape.

34. The method according to claim 30 where said conductive plates provided are stainless steel.

* * * * *